(12) United States Patent
Hashizume

(10) Patent No.: US 7,961,348 B2
(45) Date of Patent: Jun. 14, 2011

(54) IMAGE SCANNING APPARATUS AND SHADING CORRECTION METHOD

(75) Inventor: Yusuke Hashizume, Chiba-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 708 days.

(21) Appl. No.: 12/015,727

(22) Filed: Jan. 17, 2008

(65) Prior Publication Data

US 2008/0170273 A1 Jul. 17, 2008

(51) Int. Cl.
H04N 1/047 (2006.01)
H04N 1/407 (2006.01)

(52) U.S. Cl. ......... 358/1.6; 358/3.26; 358/461; 358/474

(58) Field of Classification Search .................. 358/1.6, 358/1.9, 3.26, 461, 463, 474; 382/275
See application file for complete search history.

(56) References Cited

U.S. PATENT DOCUMENTS

| | | | | |
|---|---|---|---|---|
| 6,295,140 | B1 * | 9/2001 | Kameyama | 358/461 |
| 7,692,818 | B2 * | 4/2010 | Futami | 358/3.26 |
| 2007/0146816 | A1 * | 6/2007 | Aoki | 358/474 |

FOREIGN PATENT DOCUMENTS

| | | | | |
|---|---|---|---|---|
| JP | 06078147 | A | * | 3/1994 |
| JP | 2000270159 | A | * | 9/2000 |
| JP | 2001086333 | A | * | 3/2001 |
| JP | 2001-313793 | | | 11/2001 |
| JP | 2002-135542 | | | 5/2002 |
| JP | 2002262035 | A | * | 9/2002 |
| JP | 2002300391 | A | * | 10/2002 |
| JP | 2002-368964 | | | 12/2002 |
| JP | 2003-018374 | | | 1/2003 |
| JP | 2003046773 | A | * | 2/2003 |
| JP | 2005006249 | A | * | 1/2005 |
| JP | 2005176044 | A | * | 6/2005 |
| JP | 2005316550 | A | * | 11/2005 |
| JP | 2006060693 | A | * | 3/2006 |

* cited by examiner

*Primary Examiner* — Scott A Rogers
(74) *Attorney, Agent, or Firm* — Turocy & Watson, LLP

(57) ABSTRACT

The present invention provides a technique that makes it possible to realize highly accurate shading correction regardless of presence of dust or the like in a shading correction plate without preventing a reduction in a size of an apparatus. An image scanning apparatus determines an area where dust is present in a reference area, which is an object of scanning of reference data used for shading correction in the image scanning apparatus, scans the reference data from an area excluding the area where it is determined that dust is present, and performs shading correction on the basis of the reference data scanned from the area excluding the area where it is determined that dust is present.

17 Claims, 9 Drawing Sheets

IMAGE SCANNING APPARATUS AND SHADING CORRECTION METHOD

BACKGROUND OF THE INVENTION

1. Field of the Invention

The present invention relates to a technique for improving correction accuracy of shading correction in an image scanning apparatus.

2. Description of the Related Art

Conventionally, it is known that a voltage level accumulated in a CCD line sensor in an image scanning apparatus depends largely on states of a light source (when the light source is turned on and when the light source is stabilized) and ambient temperature (see, for example, JP-A-8-105357). Therefore, the image scanning apparatus performs shading correction at timing such as immediately before image scanning and adjusts a white level and a black level with respect to an image to make it possible to always acquire same image data under all conditions.

In the shading correction, a white shading correction plate is used. The correction plate is scanned by several lines and density fluctuation in an image is corrected using an average of scanned data as a reference of a white level and a black level (see, for example, JP-A-9-294207).

However, when dust or the like adheres to the shading correction plate, a value of a shading correction coefficient obtained by scanning the shading correction plate by several lines and averaging scanned data is small compared with that obtained when dust or the like does not adhere to the correction plate. This causes an image streak.

FIG. 9 is a graph showing image profile data obtained when dust adheres to the shading correction plate. In the figure, 8-bit luminance value data (on the abscissa, "0 (black)" to "255 (white)") is shown. As shown in the figure, density is high only in a portion to which dust adheres. When such data is adopted as white reference data for shading correction, since the white reference data of a pixel in the portion to which dust adheres (and pixels around the portion) is dark, image data scanned for the portion is white and appears as a streak on an image. The same streak image also occurs when air bubbles are present in glass plates that hold the shading correction plate.

When the streak image due to dust or the like present on the shading correction plate appears as described above, it is a general practice to perform setting for changing a scanning start position on the shading correction plate. To perform data acquisition necessary and sufficient for shading correction taking into account likelihood of presence of dust, there is a limit in a reduction of a size of the shading correction plate.

SUMMARY OF THE INVENTION

It is an object of the present invention to provide a technique that makes it possible to realize highly accurate shading correction regardless of presence of dust or the like in a shading correction plate without preventing a reduction in a size of an apparatus.

In order to solve the problems described above, an image scanning apparatus according to an aspect of the present invention includes an area determining unit that determines an area where dust is present in a reference area, which is an object of scanning of reference data used for shading correction, a scanning control unit that causes the image scanning apparatus to scan the reference data from an area excluding the area in the reference area where it is determined by the area determining unit that dust is present, and a correction processing unit that performs shading correction on the basis of the reference data that the scanning control unit causes the image scanning apparatus to scan.

An image scanning apparatus according to another aspect of the present invention includes area determining means for determining an area where dust is present in a reference area, which is an object of scanning of reference data used for shading correction, scanning control means for causing the image scanning apparatus to scan the reference data from an area excluding the area in the reference area where it is determined by the area determining means that dust is present, and correction processing means for performing shading correction on the basis of the reference data that the scanning control means causes the image scanning apparatus to scan.

A shading correction method according to still another aspect of the present invention includes determining an area where dust is present in a reference area, which is an object of scanning of reference data used for shading correction in an image scanning apparatus, scanning the reference data from an area excluding the area in the reference area where it is determined that dust is present, and performing shading correction on the basis of the reference data scanned from the area excluding the area where it is determined that dust is present.

DESCRIPTION OF THE EMBODIMENTS

Embodiments of the present invention will be hereinafter explained with reference to the accompanying drawings.

Figure 1:
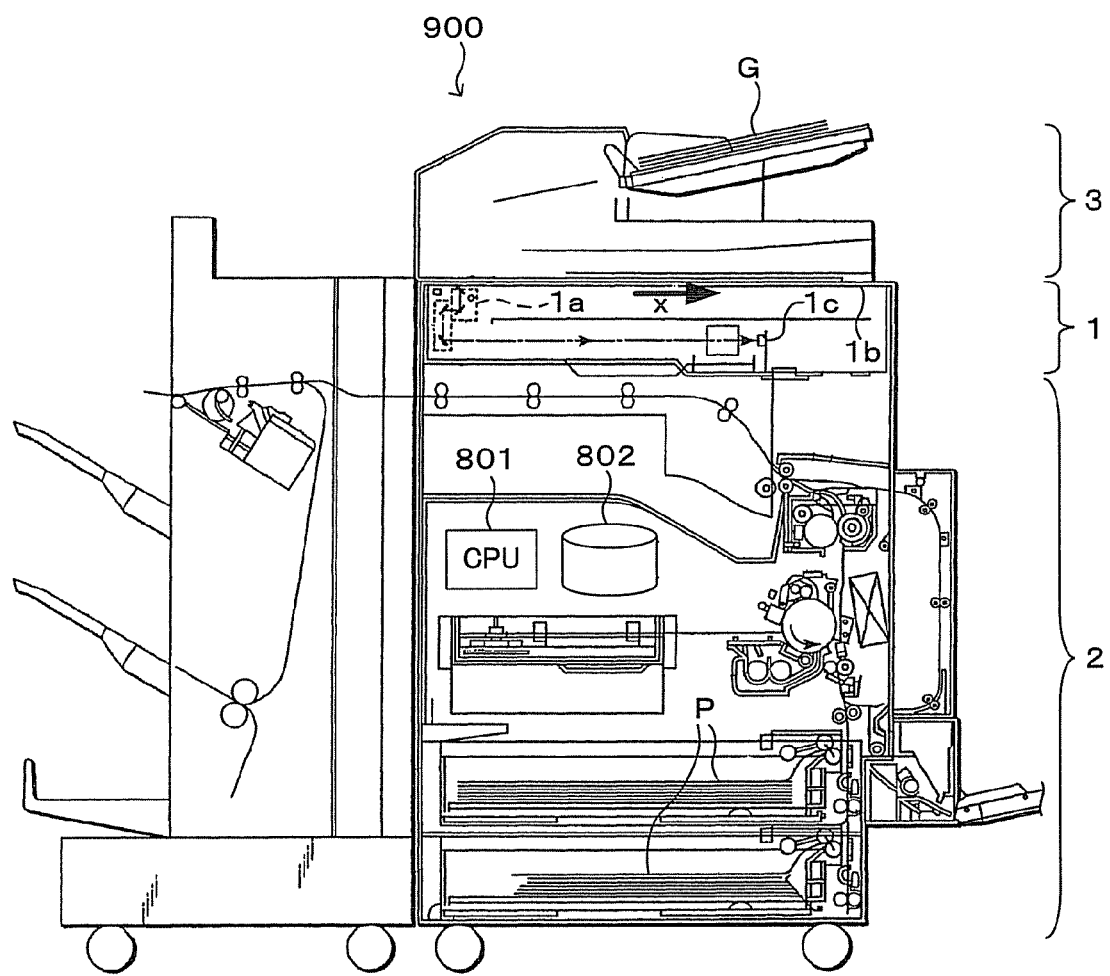
FIG. 1 is a longitudinal sectional view showing the structure of an image processing apparatus including an image scanning apparatus 1 according to an embodiment of the present invention.

FIG. 1 is a longitudinal sectional view showing the structure of an image processing apparatus (MFP: Multi Function Peripheral) 900 including an image scanning apparatus 1 according to an embodiment of the present invention.

The image processing apparatus 900 according to this embodiment includes the image scanning apparatus 1, an image forming apparatus 2, and an ADF (Auto document feeder) 3.

The image scanning apparatus 1 optically scans, using a scanning optical system 1a and a CCD 1c that can perform scanning in an arrow x direction, an original surface of an original placed on an original stand glass 1b and an original G conveyed by the ADF 3. In this specification, a system for scanning an original placed on the original stand glass 1b is referred to as "stationary original scanning system" and a system for scanning an original conveyed by the ADF 3 is referred to as "automatically conveyed original scanning system".

The image forming apparatus 2 forms an image on a sheet P on the basis of image data scanned from an original by the image scanning apparatus 1 or image data received from an external apparatus (including an external storage device) by the image processing apparatus 900.

The ADF 3 has a function capable of continuously conveying originals G stacked on a tray as shown in FIG. 1 to pass an image scanning position on the original stand glass 1b in the image scanning apparatus 1.

With the image scanning apparatus 1 and the image forming apparatus 2 having the functions described above, it is possible to realize "copy processing" for forming images scanned from the originals G on sheets P.

Figure 2:
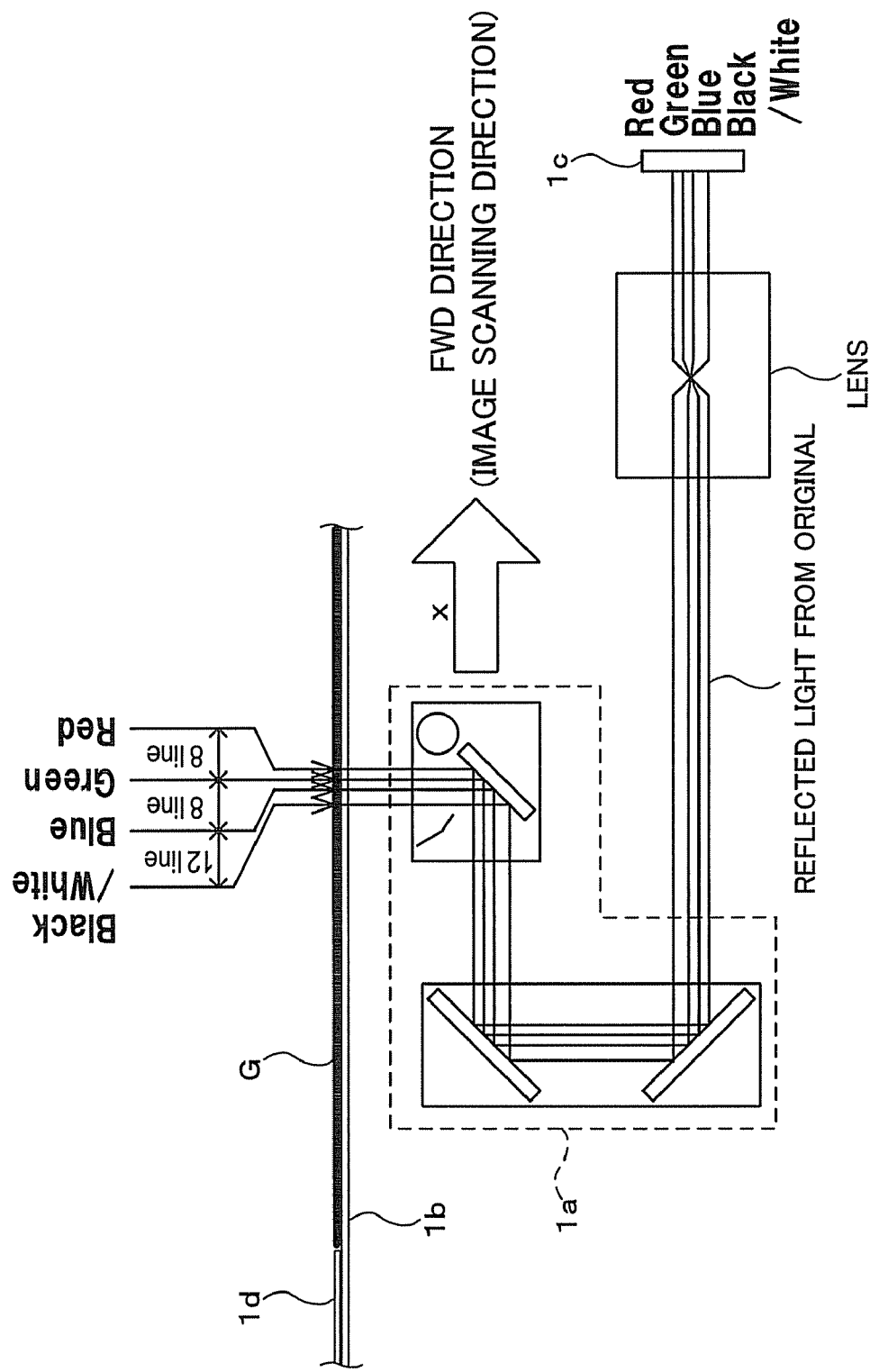
FIG. 2 is a diagram showing details of the structure of a scanning optical system 1a and a CCD 1c in the image scanning apparatus 1 according to the embodiment.

FIG. 2 is a diagram showing details of the structure of the scanning optical system 1a and the CCD 1c in the image scanning apparatus 1 according to this embodiment. The CCD 1c is a 4-line CCD in which three line color elements covered with not-shown color separation filters for R (red), G (green), and B (blue) and one line white and black element without a filter are arranged in four rows. With the CCD 1c, the image scanning apparatus 1 can perform image scanning in monochrome and in color. A shading correction plate 1d for performing shading correction in the image scanning apparatus 1 is arranged on an upstream side in a scanning direction x of the scanning optical system 1a in the original stand glass 1b.

In the image scanning apparatus 1, it is possible to change a magnification for image scanning from an original (e.g., 50%, 100%, 200%, and 400%) by changing scanning speed in the x direction (see FIGS. 1 and 2) of the scanning optical system 1a.

Figure 3:
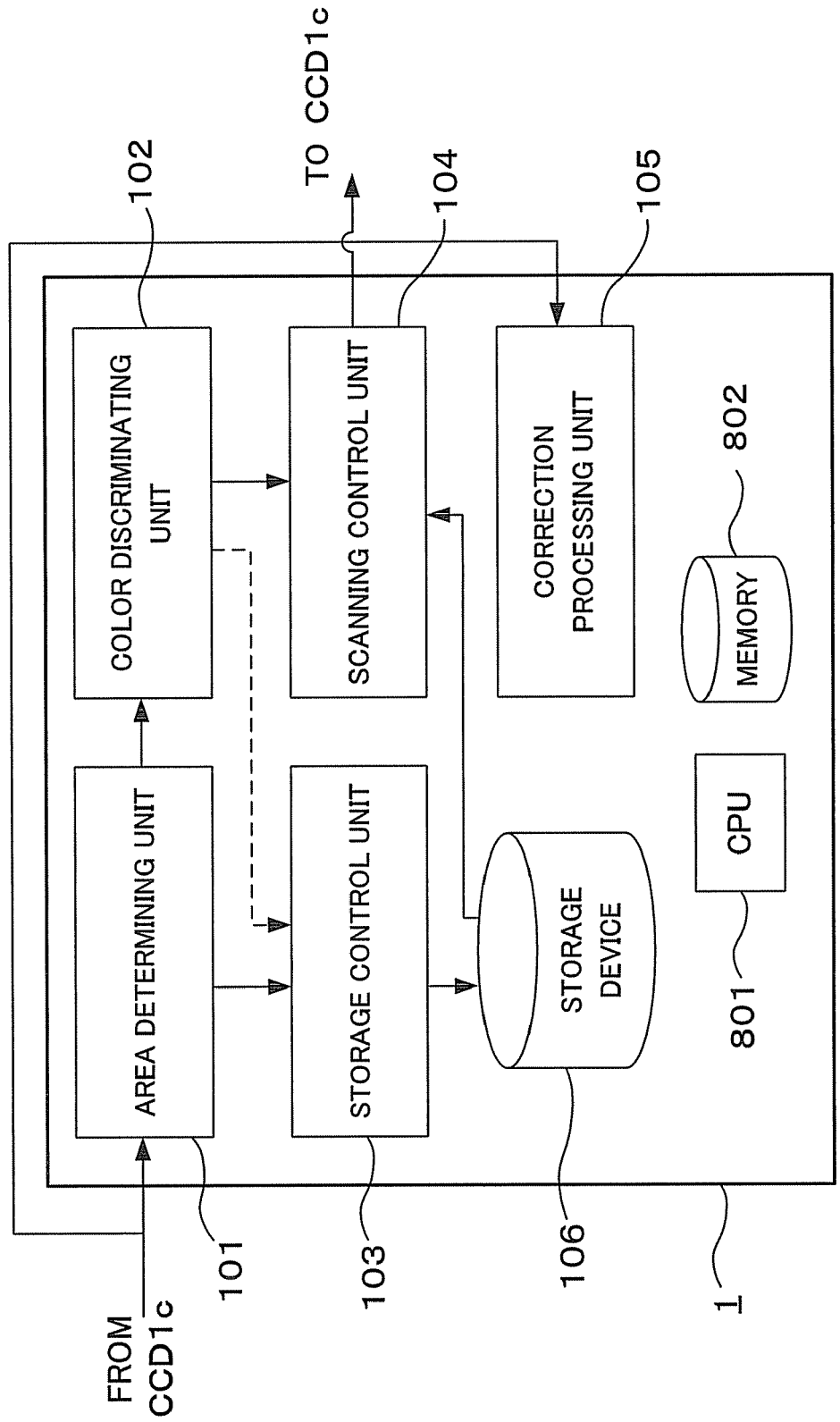
FIG. 3 is a functional block diagram for explaining the image scanning apparatus 1 according to the embodiment.

FIG. 3 is a functional block diagram for explaining the image scanning apparatus 1 according to this embodiment.

Specifically, the image scanning apparatus 1 according to this embodiment includes an area determining unit 101, a color discriminating unit 102, a storage control unit 103, a scanning control unit 104, a correction processing unit 105, a storage device 106, a CPU 801, and a memory 802.

The area determining unit 101 determines, on the basis of a result of scanning of the shading correction plate 1d in the image scanning apparatus 1, an area where dust is present in a reference area on the shading correction plate 1d, which is an object of scanning of reference data (a luminance value, etc.) used for shading correction in the image scanning area 1. "Dust" includes not only literal dust or dirt but also what affects scanning of the shading correction plate such as stain due to oil, water, paint, and the like.

The determination on dust in the area determining unit 101 does not always have to be based on a result of scanning of the shading correction plate 1d in the image scanning apparatus 1. For example, when a coordinate or the like of dust present on the shading correction plate 1d is known in advance, dust may be determined on the basis of information concerning the coordinate or the like.

The color discriminating unit 102 discriminates a color of dust or stain determined by the area determining unit 101.

The storage control unit 103 causes the storage device 106 to store information (e.g., a coordinate value, an area ID, and a function) concerning an area where it is determined by the area determining unit 101 that dust is present (an area that hinders scanning of reference data for shading correction on the shading correction plate id). As the storage device 106, for example, it is possible to adopt an NVRAM (Nonvolatile Random Access Memory). However, the storage device 106 is not limited to this and may be a storage device having other structure as long as the storage device can maintain, in a state in which the supply of power is interrupted, the information stored at certain timing.

An area as an object of scanning of reference data used for shading correction involved in the static original scanning system and an area as an object of scanning of reference data used for shading correction involved in the automatically conveyed original scanning system may be set in positions different from each other. In such a case, the area determining unit 101 according to this embodiment determines areas where dust is present in the respective scanning object areas. The storage control unit 103 causes the storage device 106 to store information concerning the areas in the respective scanning object areas (plural reference areas) where it is determined by the area determining unit 101 that dust is present.

An area as an object of scanning of reference data used for shading correction involved in the static original scanning system and an area as an object of scanning of reference data used for shading correction involved in the automatically conveyed original scanning system may be set in the same position on the shading correction plate 1d. In such a case, the storage control unit 103 causes the storage device 106 to store, in association with the stationary original scanning system and the automatically conveyed original scanning system, pieces of information concerning the areas (reference areas) in the reference area where it is determined by the area determining unit 101 that dust is present, respectively.

Consequently, for example, setting work concerning shading correction performed when a service person installs the image scanning apparatus (setting of an area where reference data can be scanned in a white reference plate, adjustment of a scanning start position, etc.) is made unnecessary. Therefore, it is possible to realize a reduction in cost through a reduction of man hour of the service person.

Because of the structure of the apparatus, a direction of scanning of the shading correction plate may be different during shading correction corresponding to the stationary original scanning system and during shading correction corresponding to the automatically conveyed original scanning system. In such a case, it is desirable to scan the scanning optical system 1a in respective different directions and cause the storage device 106 to store positions of dust in association with the respective scanning systems.

The scanning control unit 104 acquires, from the storage device 106, information concerning areas where it was determined by the area determining unit 101 in the past that dust was present. The scanning control unit 104 causes the image scanning apparatus 1 to perform scanning of reference data from an area excluding the areas in the reference areas on the shading correction plate id where it was determined by the area determining unit 101 that dust was present.

The correction processing unit 105 performs shading correction on the basis of the reference data scanned by the image scanning apparatus 1 according to a command from the scanning control unit 104.

In this way, the scanning control unit 104 acquires, from the storage device 106, the information concerning the areas where it is determined in the past that dust was present and controls a scanning area on the shading correction plate 1d on the basis of the acquired information. Consequently, it is possible to effectively reuse a result of the determination performed by the area determining unit 101 in the past. Further, since it is unnecessary to determine an area where dust is present every time shading correction is performed, it is possible to contribute to a reduction in time necessary for shading correction.

The CPU 801 has a role of performing various kinds of processing in the image scanning apparatus 1 and also has a role of realizing various functions by executing programs stored in the memory 802. The memory 802 includes a ROM and a RAM and has a role of storing various kinds of information and programs used in the image scanning apparatus 1.

Figure 4:
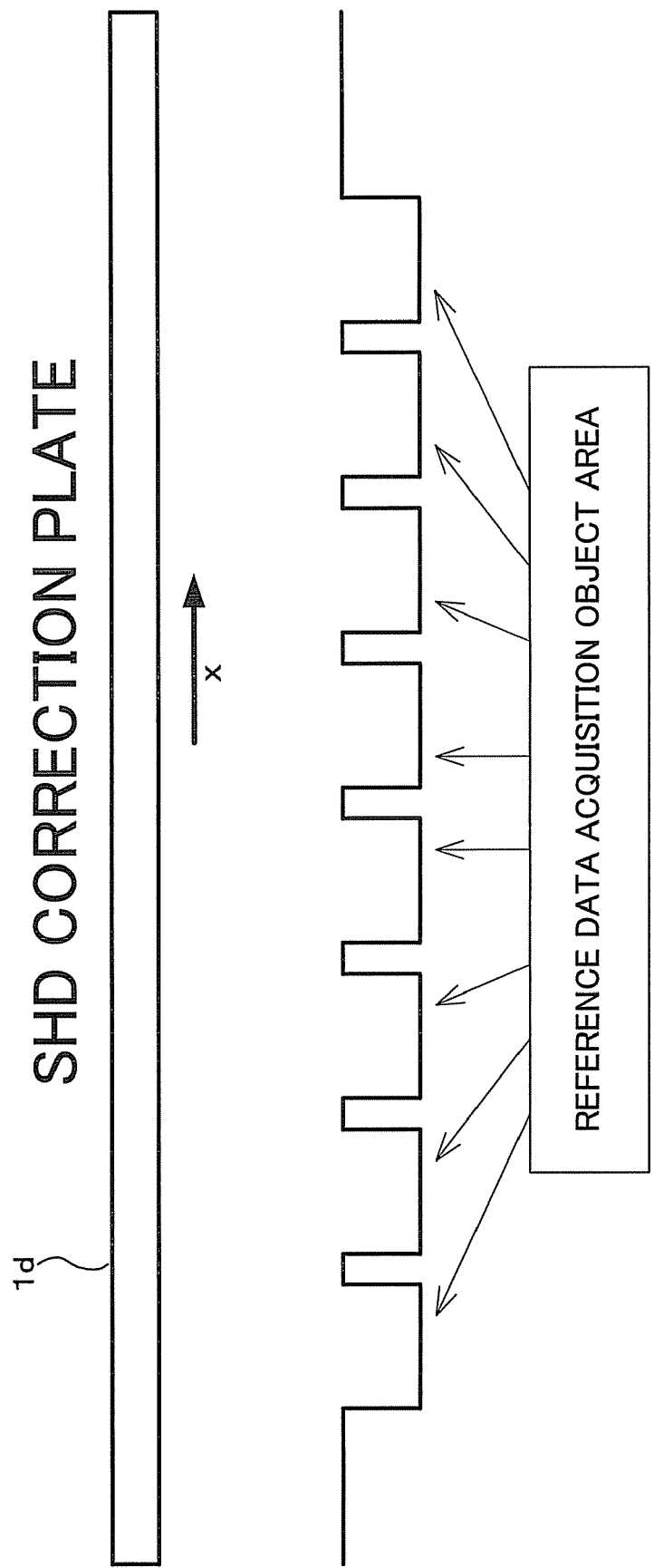
FIG. 4 is a conceptual diagram for explaining scanning areas where reference data is obtained when no dust is present on a shading correction plate in shading correction in the image scanning apparatus 1 according to the embodiment.
Figure 5:
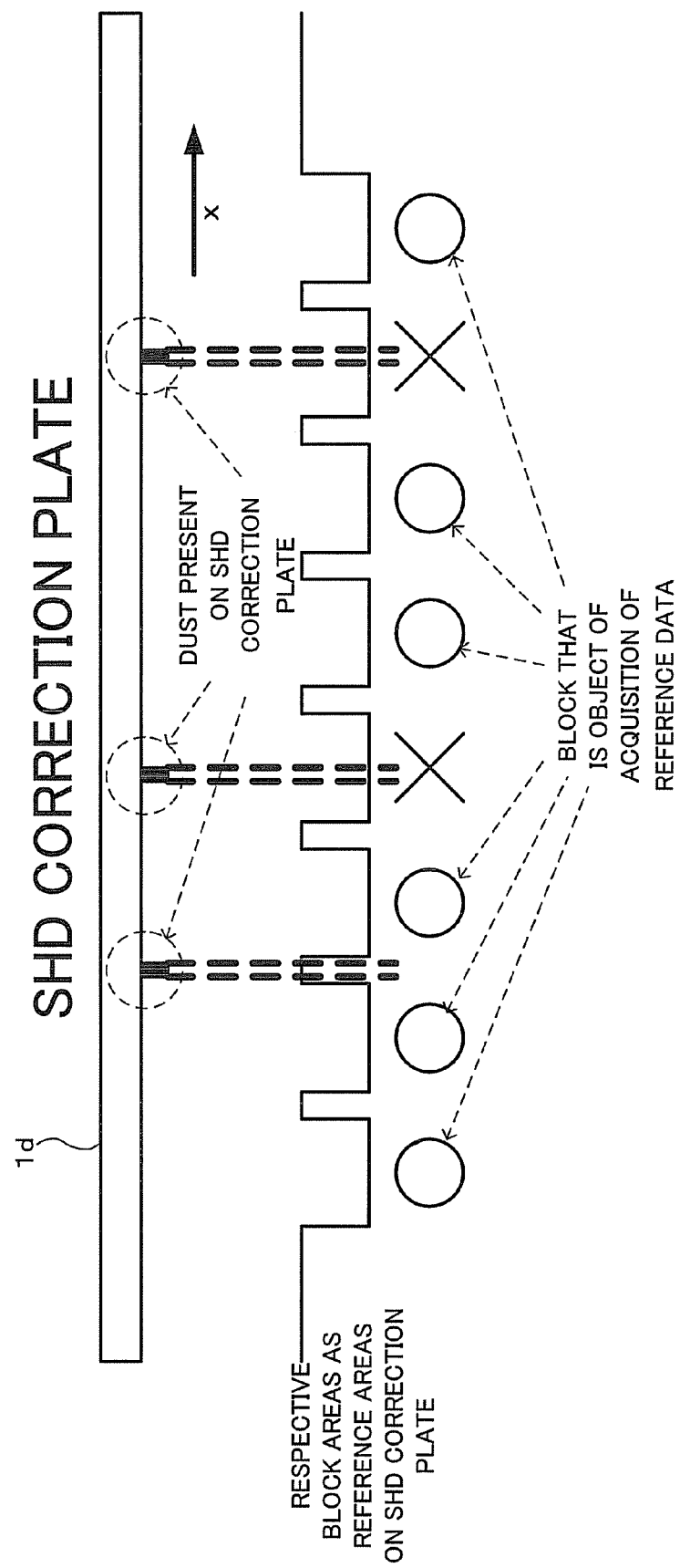
FIG. 5 is a conceptual diagram for explaining scanning areas where reference data is obtained when dust is present on the shading correction plate in shading correction in the image scanning apparatus 1 according to the embodiment.

FIG. 4 is a conceptual diagram for explaining scanning areas where reference data is obtained when no dust is present on the shading correction plate in shading correction in the image scanning apparatus 1 according to this embodiment. FIG. 5 is a conceptual diagram for explaining scanning areas where reference data is obtained when dust is present on the shading correction plate in shading correction in the image scanning apparatus 1 according to this embodiment. In FIG. 4 and subsequent figures, when necessary, "shading" is described as "SHD" to reduce a space for description. In an example explained in this embodiment, scanning of reference data used for shading correction is dividedly performed for each of blocks having a predetermined data length. It goes without saying that the scanning of reference data may be realized by continuously scanning data having a necessary data length without dividing the blocks.

As shown in FIG. 5, it is seen that, in the image scanning apparatus 1 according to this embodiment, reference data is scanned from areas excluding areas where dust is present on the shading correction plate 1d.

In this way, reference data with a necessary data amount is scanned avoiding only the areas where dust is present in a reference area. Consequently, compared with shading correction in the past performed by setting an entire scanning area having a fixed length avoiding dust, it is possible to narrow an area in which the reference area (the shading correction plate 1d) is provided (a size in the x direction) and contribute to a reduction in a size of the entire apparatus.

The reference data is scanned only from the areas where dust is not present in the reference area. Consequently, it is possible to realize high-quality image scanning by realizing creation of more highly accurate data for shading correction.

According to this embodiment, even when a shading correction plate mixed with dust is used, it is possible to perform highly accurate shading correction. Therefore, it is possible to improve yield of manufacturing shading correction plates.

Conventionally, when dust or the like is present on a shading correction plate, a service person performs setting for changing a scanning start position on the shading correction plate, for example, when the shading correction plate is shipped from a factory. However, by adopting the image scanning apparatus according to this embodiment, it is possible to automatically perform processing from determination of an area where dust is present to control of scanning of reference data. Therefore, it is possible to substantially reduce work man hour during shipping and maintenance of the apparatus.

Figure 6:
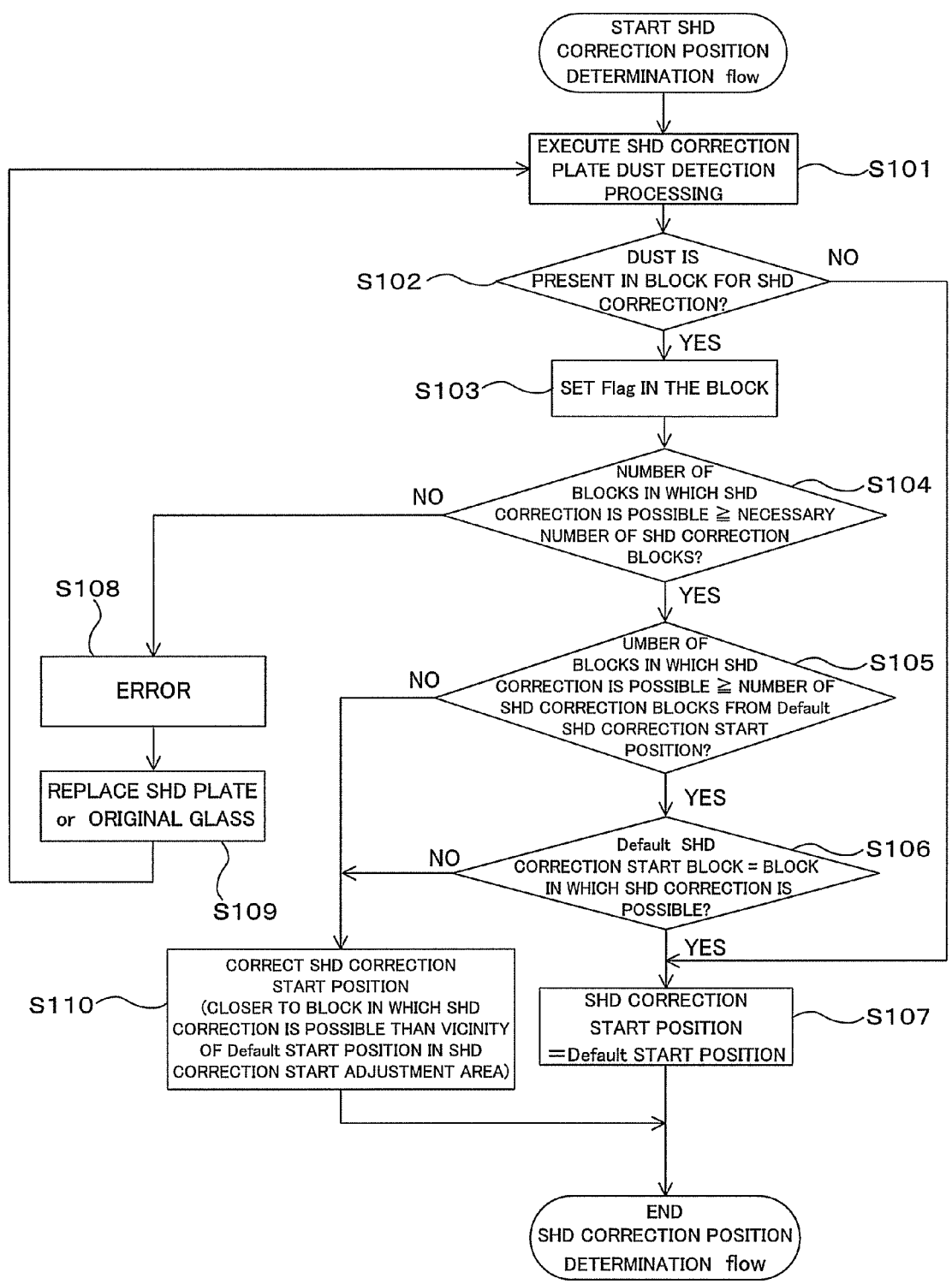
FIG. 6 is a flowchart for explaining a flow of processing for setting a scanning start position on a shading correction plate 1d in processing in the image scanning apparatus 1 according to the embodiment.

FIG. 6 is a flowchart for explaining a flow of processing for setting a scanning start position on the shading correction plate 1d in processing (a shading correction method) in the image scanning apparatus 1 according to this embodiment.

First, the image scanning apparatus 1 scans a scanning object surface (a white reference surface) of the shading correction plate 1d. The area determining unit 101 performs dust detection processing on the basis of data obtained as a result of the scanning processing (S101).

As a result of the processing in the area determining unit 101, it may be determined that dust is present on the shading correction plate 1d. In such a case, when the dust is present in an area of a scanning object block on the shading correction plate 1d (S102, Yes), the correction processing unit 105 sets a flag in the block (S103). The correction processing unit 105 causes the storage device 106 to store information concerning the flag set in association with the object block.

When the number of blocks that can be set as objects of acquisition of reference data is equal to or larger than the number of blocks necessary for acquiring reference data used for shading correction as a result of the processing (S104, Yes), the correction processing unit 105 proceeds to S105. On the other hand, when the number of blocks that can be set as objects of acquisition of reference data is less than the number of blocks necessary for acquiring reference data used for shading correction (S104, No), the correction processing unit 105 displays error notification on a not-shown display (S108) and performs notification for requesting replacement of the shading correction plate 1d or the original stand glass 1b (S109).

Subsequently, when the number of blocks that can be set as objects of acquisition of reference data is equal to or larger than the number of blocks necessary for acquiring reference data used for shading correction from a default scanning start position (S105, Yes) and when a default scanning start block and a block that can be set as an object of acquisition of reference data coincide with each other (S106, Yes), the correction processing unit 105 sets the default scanning start position as a reference data scanning start position (S107). In this way, reference data is scanned only from blocks in the number necessary and sufficient for scanning reference data having a necessary data amount. The necessary and sufficient number of blocks is calculated from the number of lines necessary for shading correction processing (averaging processing).

On the other hand, when the number of blocks that can be set as objects of acquisition of reference data is smaller than the number of blocks necessary for acquiring reference data used for shading correction from the default scanning start position (S105, No) or when the default scanning start block and a block that can be set as an object of acquisition of reference data do not coincide with each other (S106, No), the correction processing unit 105 corrects the reference data scanning start position on the shading correction plate 1d (S110).

When it is determined that dust is not present on the shading correction plate id as a result of the processing in the area determining unit 101 (S102, No), the correction processing unit 105 sets the default scanning start position as a reference data scanning start position (S107).

The determination processing by the area determining unit 101 can be performed at timing such as the time of shipment of the image processing apparatus 900, the time of maintenance by the service person, the time when a predetermined number of prints are printed, and the time when a predetermined number of sheets are scanned. However, in order to maintain scanning performance in the image scanning apparatus 1, it is preferable to perform the determination processing every time before starting the image scanning processing.

It is preferable to perform the shading correction processing by the correction processing unit 105 every time before starting the image scanning processing. In this way, it is possible to reduce a difference between environments at the time of implementation of the shading correction processing and at the time of actual image scanning (a change in luminance of a light source, etc.) as much as possible and contribute to improvement of image scanning performance.

It is possible to secure long time as time for stabilization of luminance of the light source by carrying out shading correction immediately before the image scanning processing.

The respective steps in the processing in the image scanning apparatus 1 are realized by causing the CPU 801 to execute a shading correction program stored in the memory 802.

Figure 7:
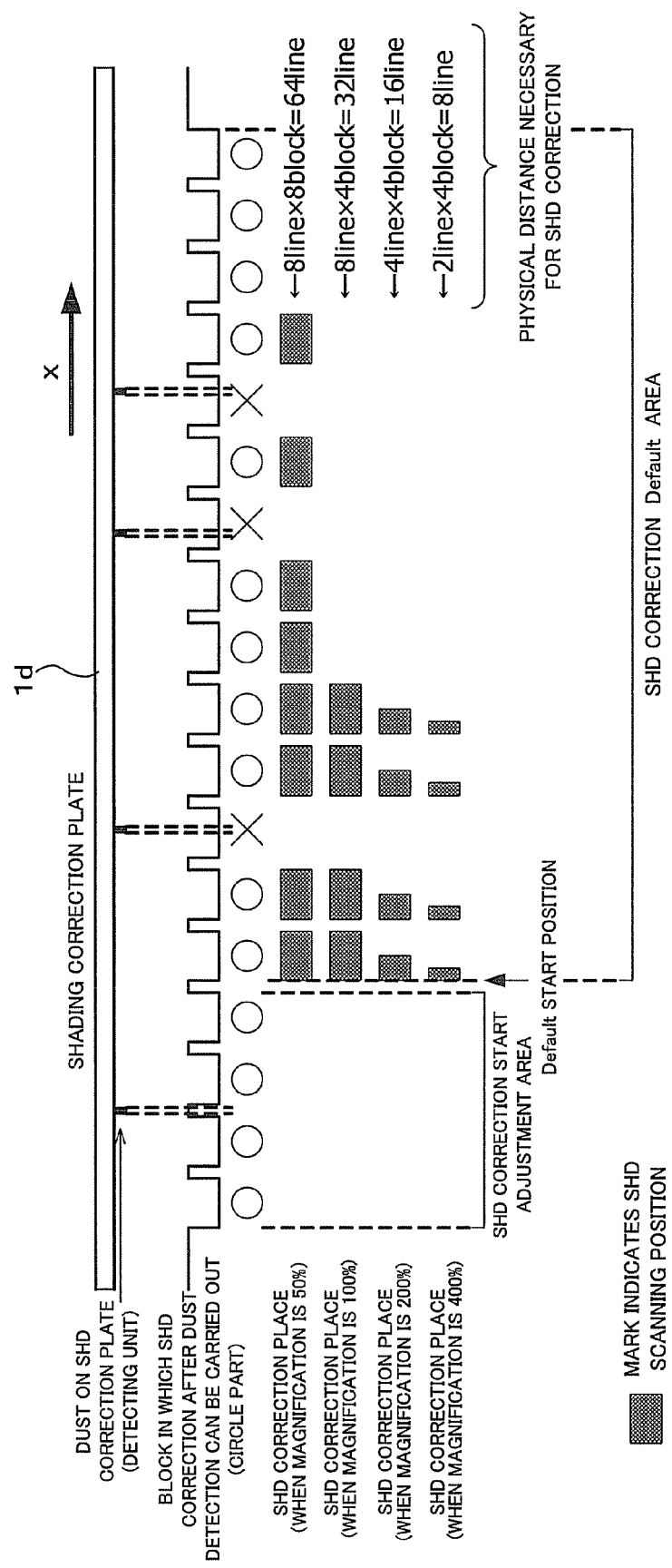
FIG. 7 is a diagram showing scanning areas where reference data is obtained during shading correction involved in image scanning at each of plural kinds of scanning magnifications.

FIG. 7 is a diagram showing reference data scanning areas during shading correction involved in image scanning at respective plural kinds of scanning magnifications (50%, 100%, 200%, and 400%).

In an example shown in the figure, the number of readable lines in respective blocks set on the shading correction plate id is determined (here, eight lines). The number of blocks in which reference data should be scanned is calculated on the basis of the number of lines necessary for shading correction.

When it is assumed that the number of lines necessary for performing shading correction is thirty-two, a physical distance is equivalent to sixty-four lines when the scanning magnification is 50%, thirty-two lines when the scanning magnification is 100%, sixteen lines when the scanning magnification is 200%, and eight lines when the scanning magnification is 400%. The necessary number of lines is calculated from the number of lines per one block and the scanning magnification.

As it is seen from FIG. 7, the scanning control unit 104 causes the image scanning apparatus 1 to scan at least a part of reference data from a common area in the reference area on the shading correction plate 1*d* during shading correction involved in image scanning at the respective plural kinds of scanning magnifications.

In this way, in shading correction involved in image scanning at the respective plural kinds of scanning magnifications, the same area is set as scanning objects as much as possible. Consequently, it is possible to control fluctuation in a reference color due to a difference in a scanned area and contribute to improvement of correction accuracy in shading correction.

The scanning control unit 104 causes the image scanning apparatus 1 to start scanning of at least a part of reference data from a common position in the reference area on the shading correction plate 1*d* during shading correction involved in image scanning at the respective plural kinds of scanning magnifications.

Usually, when the image scanning apparatus 1 performs image scanning at different scanning magnifications, the image scanning apparatus 1 acquires reference data from different ranges in these kinds of image scanning. Therefore, ranges for scanning reference data from the reference area are different in shading correction in image scanning at a scanning magnification with a wide range, which is an object of acquisition of reference data, and shading correction in image scanning at a scanning magnification with a narrow range, which is an object of acquisition of reference data. Therefore, in order to control occurrence of fluctuation in correction accuracy of shading correction among such kinds of image scanning processing at the different scanning magnifications, reference data scanning is started from the same position as much as possible in shading correction during these kinds of image scanning at the different scanning magnifications. In this way, contents of reference data used during the kinds of shading correction corresponding to the respective magnifications are shared as much as possible to prevent fluctuation in correction accuracy of shading correction.

Figure 8:
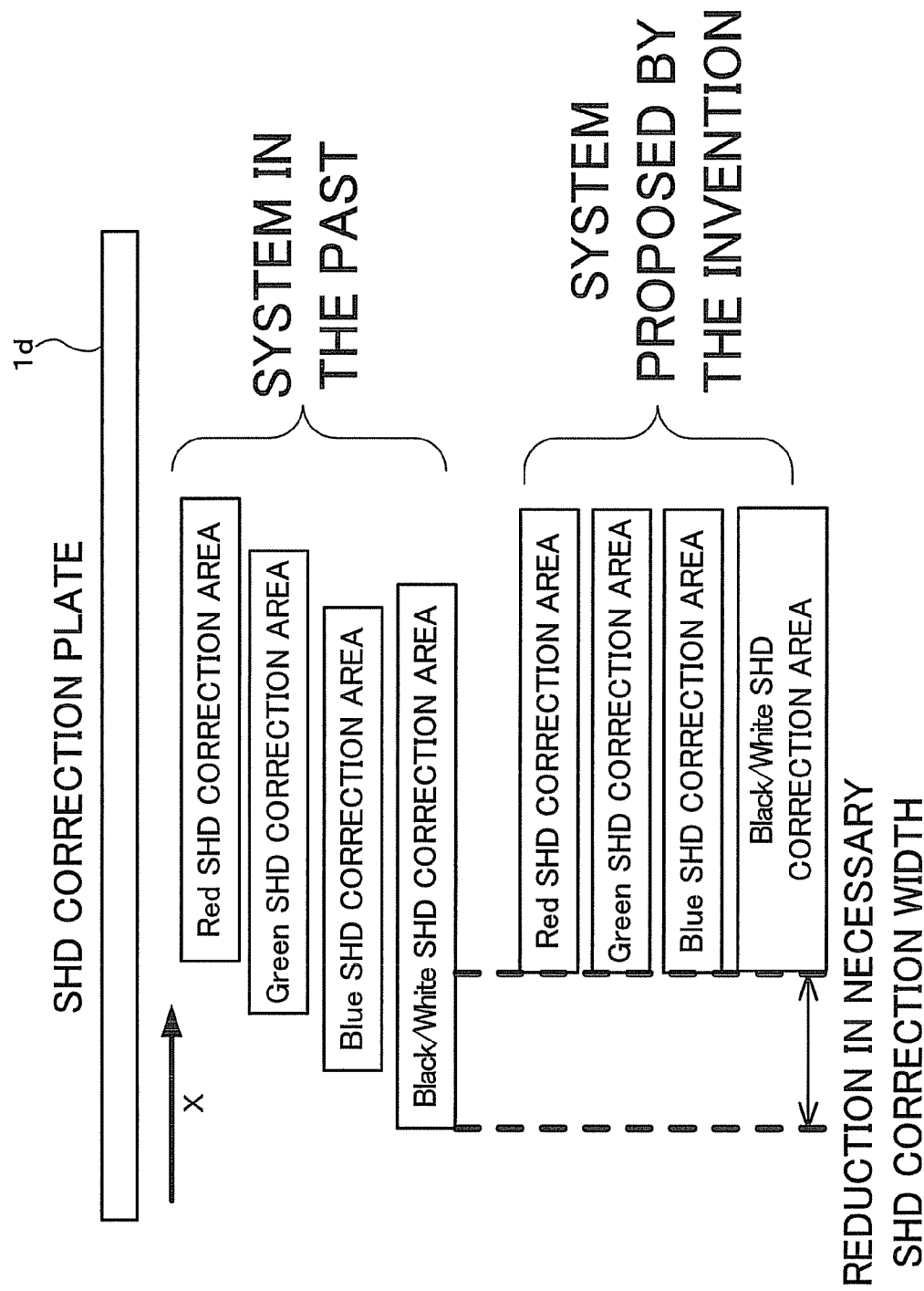
FIG. 8 is a diagram showing a relation among scanning ranges for reference data necessary for shading correction for each of scanning colors during color scanning.
Figure 9:
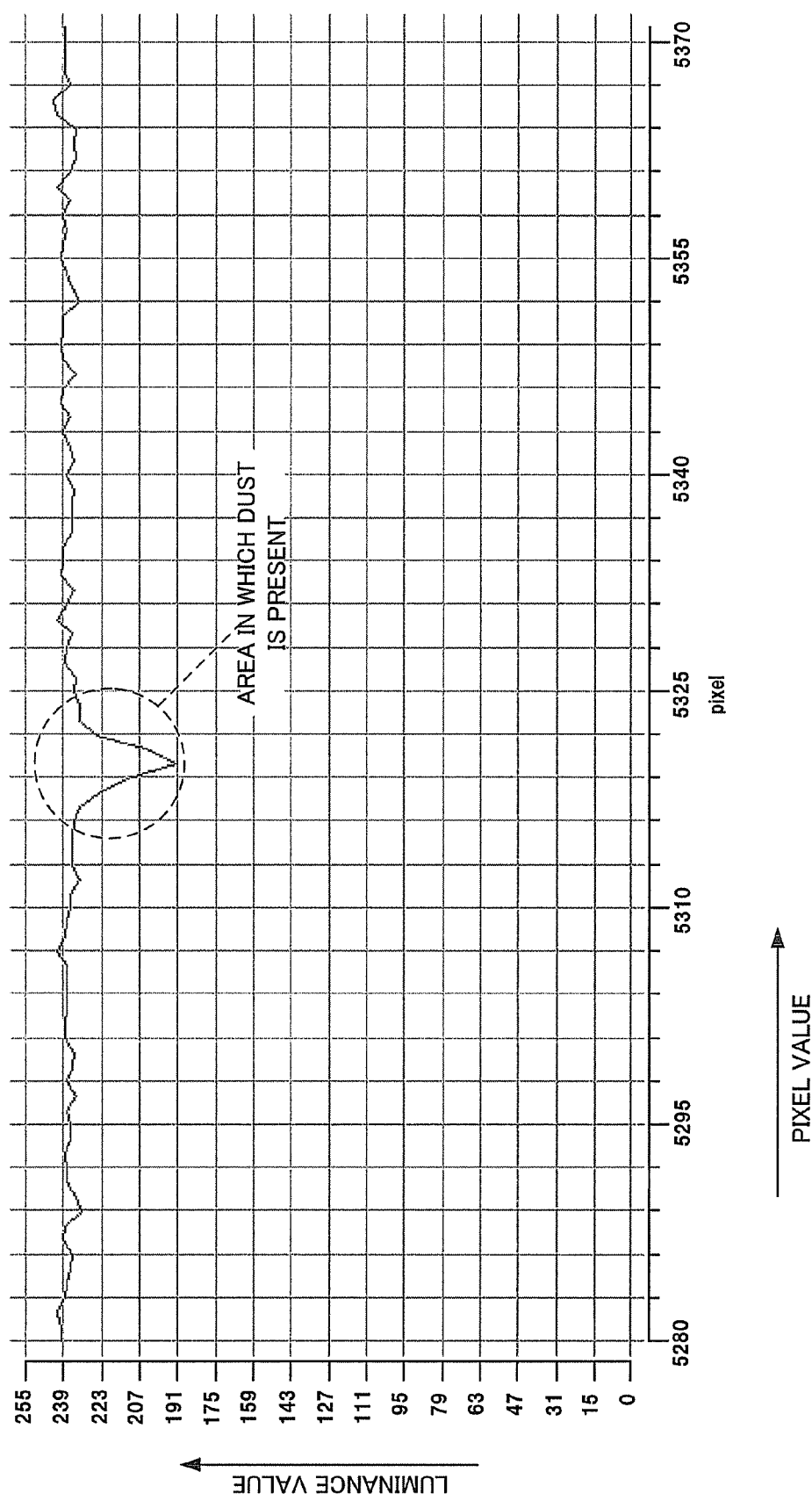
FIG. 9 is a graph showing image profile data obtained when dust adheres to a shading correction plate.

FIG. 8 is a diagram showing a relation among scanning ranges for reference data necessary for shading correction for each of scanning colors during color scanning.

During image scanning in color, shading correction is carried out for respective scanning colors in order of "Red", "Green", "Blue", and "Black & White". However, it is possible to realize a reduction in a size of the shading correction plate 1*d* by setting reference data scanning start positions in shading correction corresponding to these respective scanning colors in an identical place on the shading correction plate 1*d* (see, a positional relation between the CCD and the shading correction plate shown in FIG. 2).

Timing for scanning reference data for shading correction (a reference data scanning position on the shading correction plate 1*d*) is adjusted by controlling a WHEN signal (White Enable signal). However, conventionally, since the WHEN signal is controlled at identical timing for all the colors, scanning start positions on the shading correction plate 1*d* are different from one another.

On the other hand, in the method proposed by the present invention, control timing for the WHEN signal is shifted for each of the scanning colors and a reference data scanning start position on the shading correction plate 1*d* is set common for all the scanning colors. Reference data is scanned from an identical area on the shading correction plate 1*d* in this way. Consequently, it is possible to realize a reduction in a size in the x direction of the shading correction plate 1*d* (the scanning direction of the optical system) and a reduction in a size of the image scanning apparatus 1 itself.

A color of dust discriminated by the color discriminating unit 102 may be a predetermined color set in association with shading correction performed according to any one of the plural scanning colors ("Red", "Green", "Blue", and "Black & White"). In such a case, in shading correction corresponding to the scanning color, the scanning control unit 104 according to this embodiment causes the image scanning apparatus 1 to also scan reference data from an area where the dust is present.

The storage control unit 103 according to this embodiment can cause the storage device 106 to store not only a determination result in the area determining unit 101 but also information concerning the color of dust or the like discriminated by the color discriminating unit 102 (see a broken line arrow in FIG. 3). In this case, the scanning control unit 104 acquires information concerning a discrimination result in the color discriminating unit 102 from the storage device 106.

In some case, dust or stain present on the shading correction plate 1*d* does not substantially affect scanning of luminance depending on a relation between a color of the dust or the like and a scanning color. Therefore, dust with a color less likely to adversely affect scanning of reference data in this way is treated as if the dust is not present. Consequently, it is possible to effectively use the reference area on the shading correction plate Id and contribute to improvement of yield of manufacturing of shading correction plates and a reduction in a size of the shading correction plates.

In the explanation of this embodiment, the functions of carrying out the invention are recorded in the apparatus in advance. However, the present invention is not limited to this. The same functions may be downloaded to the apparatus from a network or the same function stored in a recording medium may be installed in the apparatus. A form of the recording medium may be any form as long as the recording medium is a recording medium such as a CD-ROM that can store programs and is readable by the apparatus. The functions obtained by installation or download in advance in this way may be realized in cooperation with an OS (Operating System) in the apparatus.

In the example explained in the embodiment, an object of determination by the area determining unit 101 is mainly the shading correction plate 1d. However, it goes without saying that a member (e.g., the original stand glass 1b) likely to affect scanning of reference data used for shading correction when dust or the like is present can be an object of determination by the area determining unit 101.

In the example explained in the embodiment, the storage device 106 is included in the image scanning apparatus 1. However, the present invention is not limited to this. It is also possible to arrange the storage device 106 on the outside of the image processing apparatus 900 as long as information stored in the storage device 106 can be read by the scanning control unit 104 when necessary. It goes without saying that the storage device 106 can be arranged in a server or the like network-connected to the image processing apparatus 900 to be capable of communicating with each other.

According to the embodiment, in the image scanning apparatus, even when dust, stain, or the like adheres to the shading correction plate, it is possible to perform shading correction control avoiding the dust, stain, or the like by detecting and controlling a position where the shading correction control is performed. Therefore, it is possible to reduce man hour in an adjusting process during manufacturing and during use by a user and provide the user with a low-cost and high-image-quality scanner. It is also possible to reduce adjustment man hour in installing the ADF and provide the user with a low-cost and high-image-quality scanner.

The present invention has been explained in detail with reference to the specific embodiment. However, it would be obvious for those skilled in the art that various modifications and alterations can be made without departing from the spirit and the scope of the present invention.

As described above in detail, according to the present invention, it is possible to provide a technique that makes it possible to realize highly accurate shading correction regardless of presence of dust or the like in a shading correction plate without preventing a reduction in a size of an apparatus.

What is claimed is:

1. An image scanning apparatus comprising:
   an area determining unit configured to determine an area where dust is present excluding an area where it was determined in the past that dust was present in a reference area, which is an object of scanning of reference data used for shading correction;
   a storage control unit configured to cause a storage device to store information concerning the area where it is determined by the area determining unit that dust is present;
   a scanning control unit configured to acquire, from the storage device, information concerning the area where it is determined by the area determining unit that dust is present and configured to cause the image scanning apparatus to scan the reference data from an area excluding the area where it is determined by the area determining unit that dust is present based on the information which is acquired; and
   a correction processing unit configured to perform shading correction on the basis of the reference data that the scanning control unit causes the image scanning apparatus to scan.

2. An image scanning apparatus according to claim 1, wherein
   the image scanning apparatus is capable of scanning an image at plural kinds of scanning magnifications different from one another, and
   the scanning control unit causes the image scanning apparatus to scan at least a part of the reference data from a common area in the reference area during shading correction involved in image scanning at the respective plural kinds of scanning magnifications.

3. An image scanning apparatus according to claim 2, wherein the scanning control unit causes the image scanning apparatus to start scanning of at least a part of the reference data from a common position in the reference area during shading correction involved in image scanning at the respective plural kinds of scanning magnifications.

4. An image scanning apparatus according to claim 1, wherein
   the image scanning apparatus is capable of scanning images with plural colors different from one another,
   the image scanning apparatus includes a color discriminating unit configured to discriminate a color of dust determined by the area determining unit, and
   the scanning control unit causes the image scanning apparatus to scan, when the color of the dust discriminated by the color discriminating unit is a predetermined color set in association with shading correction performed according to any one of the plural scanning colors, the reference data also from an area where the dust is present in shading correction corresponding to the scanning color.

5. An image scanning apparatus according to claim 1, wherein
   the image scanning apparatus is capable of executing a stationary original scanning system for scanning an original placed on an original stand and an automatically conveyed original scanning system for scanning an original conveyed by an auto document feeder,
   the area determining unit determines an area where dust is present in plural reference areas different from one another, which are objects of scanning of reference data used for shading correction involved in the stationary original scanning system and the automatically conveyed original scanning system, and
   the storage control unit causes the storage device to store information concerning areas in the respective plural reference areas where it is determined by the area determining unit that dust is present.

6. An image scanning apparatus according to claim 1, wherein
   the image scanning apparatus is capable of scanning images in plural colors different from one another, and
   the scanning control unit causes the image scanning apparatus to start scanning of the reference data from a common position in the reference area during shading correction involved in image scanning according to the respective plural scanning colors.

7. An image scanning apparatus comprising:
   area determining means for determining an area where dust is present excluding an area where it was determined in the past that dust was present in a reference area, which is an object of scanning of reference data used for shading correction;

storage control means for causing a storage device to store information concerning the area where it is determined by the area determining means that dust is present;

scanning control means for acquiring, from the storage device, information concerning the area where it is determined by the area determining means that dust is present and causing the image scanning apparatus to scan the reference data from an area excluding the area in the reference area where it is determined by the area determining means that dust is present based on the information which is acquired; and correction processing means for performing shading correction on the basis of the reference data that the scanning control means causes the image scanning apparatus to scan.

8. An image scanning apparatus according to claim 7, wherein
the image scanning apparatus is capable of scanning an image at plural kinds of scanning magnifications different from one another, and
the scanning control means causes the image scanning apparatus to scan at least a part of the reference data from a common area in the reference area during shading correction involved in image scanning at the respective plural kinds of scanning magnifications.

9. An image scanning apparatus according to claim 8, wherein
the scanning control means causes the image scanning apparatus to start scanning of at least a part of the reference data from a common position in the reference area during shading correction involved in image scanning at the respective plural kinds of scanning magnifications.

10. An image scanning apparatus according to claim 7, wherein
the image scanning apparatus is capable of scanning images with plural colors different from one another,
the image scanning apparatus includes color discriminating means for discriminating a color of dust determined by the area determining means, and
the scanning control means causes the image scanning apparatus to scan, when the color of the dust discriminated by the color discriminating means is a predetermined color set in association with shading correction performed according to any one of the plural scanning colors, the reference data also from an area where the dust is present in shading correction corresponding to the scanning color.

11. An image scanning apparatus according to claim 7, wherein
the image scanning apparatus is capable of executing a stationary original scanning system for scanning an original placed on an original stand and an automatically conveyed original scanning system for scanning an original conveyed by an auto document feeder,
the area determining means determines an area where dust is present in plural reference areas different from one another, which are objects of scanning of reference data used for shading correction involved in the stationary original scanning system and the automatically conveyed original scanning system, and
the storage control means causes the storage device to store information concerning areas in the respective plural reference areas where it is determined by the area determining means that dust is present.

12. A shading correction method comprising:
determining an area where dust is present excluding an area where it was determined in the past that dust was present in a reference area, which is an object of scanning of reference data used for shading correction in an image scanning apparatus;

causing a storage device to store information concerning the area where it is determined that dust is present;
acquiring, from the storage device, information concerning the area where it is determined that dust is present;
scanning the reference data from an area excluding the area in the reference area where it is determined that dust is present based on the information which is acquired; and
performing shading correction on the basis of the reference data scanned from the area excluding the area where it is determined that dust is present.

13. A shading correction method according to claim 12, wherein
the image scanning apparatus is capable of scanning an image at plural kinds of scanning magnifications different from one another, and
the shading correction method further includes causing the image scanning apparatus to scan at least a part of the reference data from a common area in the reference area during shading correction involved in image scanning at the respective plural kinds of scanning magnifications.

14. A shading correction method according to claim 13, further comprising causing the image scanning apparatus to start scanning of at least a part of the reference data from a common position in the reference area during shading correction involved in image scanning at the respective plural kinds of scanning magnifications.

15. A shading correction method according to claim 12, wherein
the image scanning apparatus is capable of scanning images with plural colors different from one another, and
the shading correction method further includes:
discriminating a color of dust determined as being present in the reference image; and
causing the image scanning apparatus to scan, when the color of the dust discriminated is a predetermined color set in association with shading correction performed according to any one of the plural scanning colors, the reference data also from an area where the dust is present in shading correction corresponding to the scanning color.

16. A shading correction method according to claim 12, wherein
the image scanning apparatus is capable of executing a stationary original scanning system for scanning an original placed on an original stand and an automatically conveyed original scanning system for scanning an original conveyed by an auto document feeder, and
the shading correction method further includes:
determining an area where dust is present in plural reference areas different from one another, which are objects of scanning of reference data used for shading correction involved in the stationary original scanning system and the automatically conveyed original scanning system, and
causing the storage device to store information concerning areas in the respective plural reference areas where it is determined that dust is present.

17. A shading correction method according to claim 12, wherein
the image scanning apparatus is capable of scanning images in plural colors different from one another, and
the shading correction method further includes causing the image scanning apparatus to start scanning of the reference data from a common position in the reference area during shading correction involved in image scanning according to the respective plural scanning colors.

* * * * *